April 19, 1949.  R. F. PAULSON  2,467,595
SAW SETTING MACHINE
Filed June 8, 1946  4 Sheets-Sheet 1

INVENTOR.
Roy F. Paulson
BY
Reynolds & Beach
ATTORNEYS

April 19, 1949.    R. F. PAULSON    2,467,595
SAW SETTING MACHINE

Filed June 8, 1946    4 Sheets-Sheet 2

INVENTOR.
Roy F. Paulson
BY
Reynolds & Beach
ATTORNEYS

April 19, 1949. R. F. PAULSON 2,467,595
SAW SETTING MACHINE
Filed June 8, 1946 4 Sheets-Sheet 3

INVENTOR.
ROY F. PAULSON
BY
Reynolds & Beach
ATTORNEYS

INVENTOR.
Roy F. Paulson
BY Reynolds Beach
ATTORNEYS

Patented Apr. 19, 1949

2,467,595

UNITED STATES PATENT OFFICE 2,467,595

SAW SETTING MACHINE

Roy F. Paulson, near Kirkland, Wash.

Application June 8, 1946, Serial No. 675,376

14 Claims. (Cl. 76—61)

The setting of hand saws, such as a carpenter's crosscut saw, is a tedious operation requiring great skill and no little time if performed by hand. Machines to do this job are available, but are considered to be lacking in certain respects, for best results. Some attempt to perform the setting operation on multiple teeth, requiring great force and multiplying the probability of inaccuracy. Some set only to one side in one pass through the machine, requiring reversal of the saw and a second pass, with the possibility of uneven setting to opposite sides. Some set merely against a clamp, and not against an anvil of predetermined shape and angle, and the angles are uneven. Where two anvils are used, in conjunction with two dies, they are usually offset from one another in the direction of the saw's length, wherefore their pitch spacing is exact for one pitch only, and inexact for all other tooth spacings. Clamps, when used, are normally either frictional and hence impositive to maintain exactness of feed spacing, or are releasable but have no means operable during their release to prevent feed overrun. Still others attempt simultaneously to file and to set, and while in theory this is advantageous, in practice inaccuracy, in setting particularly, is likely to result.

The present operation, then, has for its general object the provision of a machine for setting such saws, which operates accurately and rapidly, and which, indeed, is comparable in rapidity of operation, accuracy, and convenience to saw filing machines such as is shown in the patent to Collier, No. 2,343,171, dated February 29, 1944. It may be, and preferably is, so cooperatively related to such a saw filing machine that the saw, set up for filing, may be at once transferred from the filing machine to the setting machine, and in the course of a few minutes can be completely filed and reset. The setting portion of such an operation can be reduced thereby to approximately six minutes, as compared with the thirty minutes which was required by hand setting operation.

More particularly it is an object of the present invention to provide a machine for setting saw teeth, which will present successive teeth at a setting point, and at that point a die will be engaged with the tooth there located in such way, and in such cooperation with an anvil located at the opposite side of the saw, as to set such tooth, and then upon advance of the saw the next tooth will be presented at precisely the same setting point, and there will be acted upon by a die applying force from the opposite side of the saw, against another cooperating anvil, the first anvil having by this time moved aside, to effect offsetting of the newly presented tooth to the opposite side of the saw. By thus effecting the setting of the teeth by the cooperative relationship of a die, an anvil, and the saw, all accurately guided and moved into correct operative relationship at one single setting point, the setting can be done accurately, uniformly, and quickly.

It is believed the general nature and objects of the invention are readily understandable from the above, and additional objects, more especially those that pertain to the mechanical arrangements of the machine, will be better understood after studying the following specification.

The invention comprises the novel saw-setting machine and method, as shown in the accompanying drawings, described in this specification, and the scope whereof will be indicated more particularly in the appended claims.

In the accompanying drawings the saw-setting machine is shown embodied in a particular and presently preferred form, but it will be obvious that many changes and rearrangements may be made in the machine in accordance with the principles hereinafter made clear.

The saw S is supported upon a guide bar B by suitable clamp means, as indicated at C. This means of supporting and guiding the saw for movement in its own plane in the direction of its length may, indeed, be the identical means by which the saw was supported and guided for movement through the saw-filing machine, and the saw-filing machine and the saw-setting machine may be so coordinated that a saw accurately set up for the saw-filing operation will be thereby accurately set for movement through the saw-setting machine. Such a bar B is guided between upper and lower rolls 9 upon slides 90 fixedly guided at 91 and adjustable vertically by the means 92, by which means the saw will be so accurately guided that its teeth T will move in a straight line through and past the setting point. This guide and support, and its adjustment, are or may be identical with similar elements in the saw-filing machine.

Figure 3:
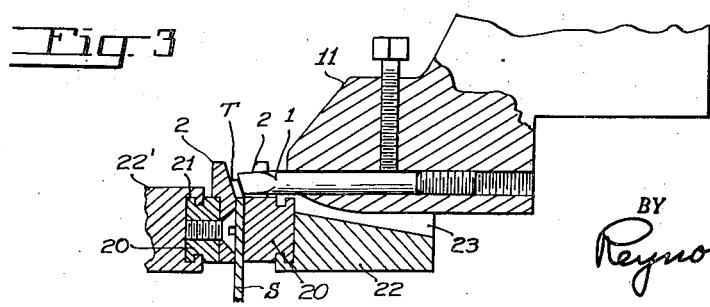
Figure 3 is a detail, in section, illustrating a die and its anvil and associated parts, in the offsetting relation.
Figure 8:
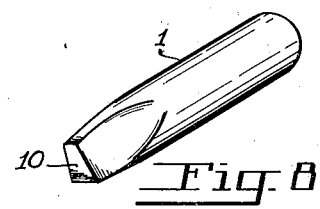
Figure 8 is an isometric view of one of the setting dies.
Figure 7:
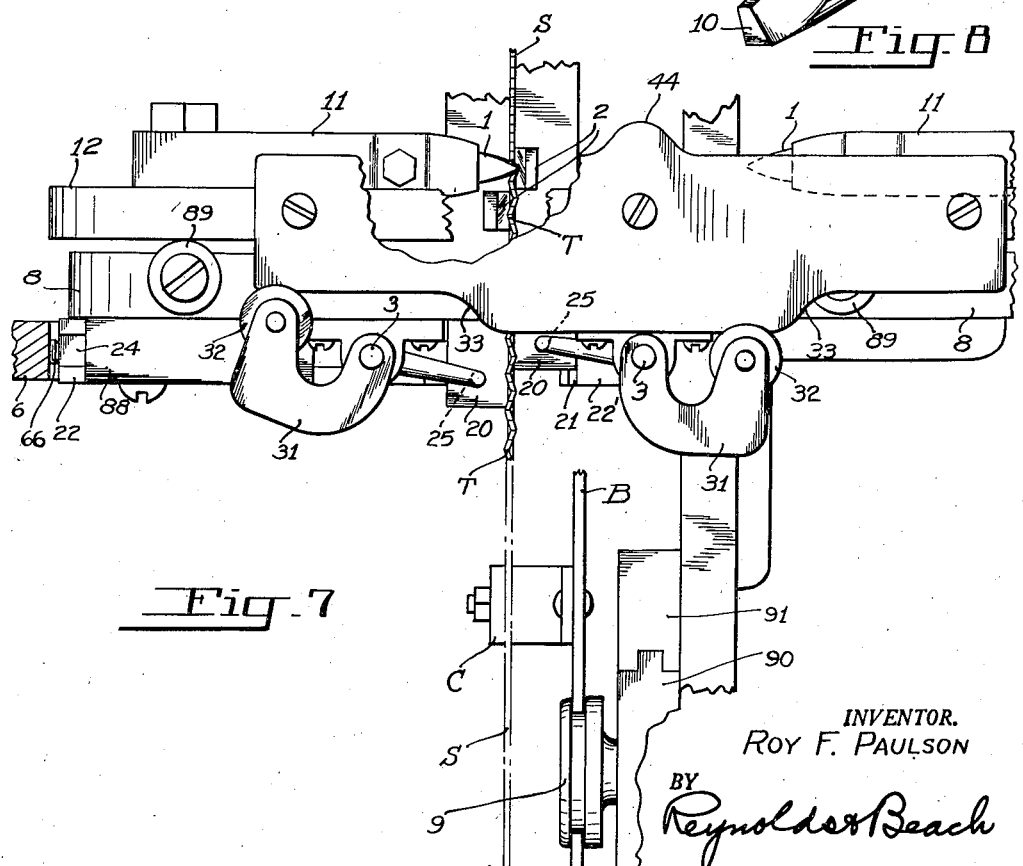
Figure 7 is a similar plan view showing the succeeding setting operation, parts of the machine being broken away or omitted in each instance for better visibility of the parts below; in particular, the saw-clamping mechanism is omitted from these views.

A die 1 (see Figure 8), having a suitably formed and inclined nose 10 to cooperate with a complementally shaped anvil 2 (see Figure 3) at the opposite side of the tooth T of the saw, is supported accurately in a holder 11, by which it may be moved away from and into engagement with the saw at the setting point. Normally two such dies, each having its complemental anvil, are located at the setting point, each directed inwardly, but from opposite sides of the saw, for movement in the same plane alternatively to and from a common setting point, for engagement alternately with the saw's teeth at opposite sides. The two such holders and their dies are supported at opposite sides of an apertured rocker plate 12, pivoted at 13 in the plane of and preferably beneath the saw to a frame 8, which normally lies generally transversely of the plane of the saw, and which is itself apertured, like the rocker plate 12, for the passage of the saw therethrough. Oscillation of the rocker plate 12 is suitably accomplished, as, for example, by the crank pin or roller 80 engageable in a slot 14 of the rocker plate, the crank pin 80 being rotatable about the axis of the drive shaft 81, provided with a crank 82 or by other suitable means for its rotation. Rollers 89 engage and space the rocker plate 12 from the frame 8.

The two dies 1 preferably oscillate in a single plane to engage the saw at alternately opposite sides at a single or common setting point, for by so doing each applies an identical offsetting force to its tooth. A little thought will make clear that, in so doing, the anvil 2 of each die would be squarely in the way of the other die, and would block the die's access to the tooth. In consequence means must be provided to shift each anvil out of the way after it has cooperated with its die 1 to set a tooth, and to shift the other anvil into operative position ready for cooperation with its die 1. Conveniently this shifting takes place substantially in the plane of the saw and in the direction of the length of the saw. To this end each anvil 2 is mounted upon a slide 20 (see Figure 5), which is guided at 21 in an element such as 22 or 22', which may be considered as a part of the frame 8. This guide member is notched, as indicated at 23, for the movement of the die 1 and its holder 11 into operative position.

Actually, at one side of the saw, if not at both sides, the member 22 is movable slightly toward and from the plane of the saw, so that in cooperation with the member 22' at the opposite side of the saw, the saw may be clamped positively during each setting operation and released immediately thereafter to enable its advance. As may be seen in Figure 5, the member 22 has a guide groove 24, by which it is guided in guides 88 in the frame 8, for movement into clamping position with relation to the saw, or for release. The means to effect such clamping movement will be described in detail shortly.

To effect shifting of the anvils 2 alternatively into and from operative position I provide a pair of upright crank shafts 3, journaled at 83 in the frame, with their crank pins 30 engaged in holes 25 in the respective slides 20. Each crank shaft 3, at its upper end, carries a rocker arm 31 with a cam follower roller 32 engageable with an edge cam 33 fixed upon and oscillatable with the rocker plate 12. Springs 34 hold the cam follower 32 in contact with the cam 33. The contour of this cam is such that, in proper synchronization, it effects rocking of each crank shaft 30 about its axis, and alternately in opposite senses, in such way that as each die, carried by the rocker plate 12, approaches the setting point, the anvil 2 of the preceding die is shifted aside, and the anvil complemental to the oncoming die is shifted into operative position at the opposite side of the tooth which is presented for engagement at the setting point, to back up that tooth, particularly at its base, against the offsetting thrust of the die.

Figure 2:
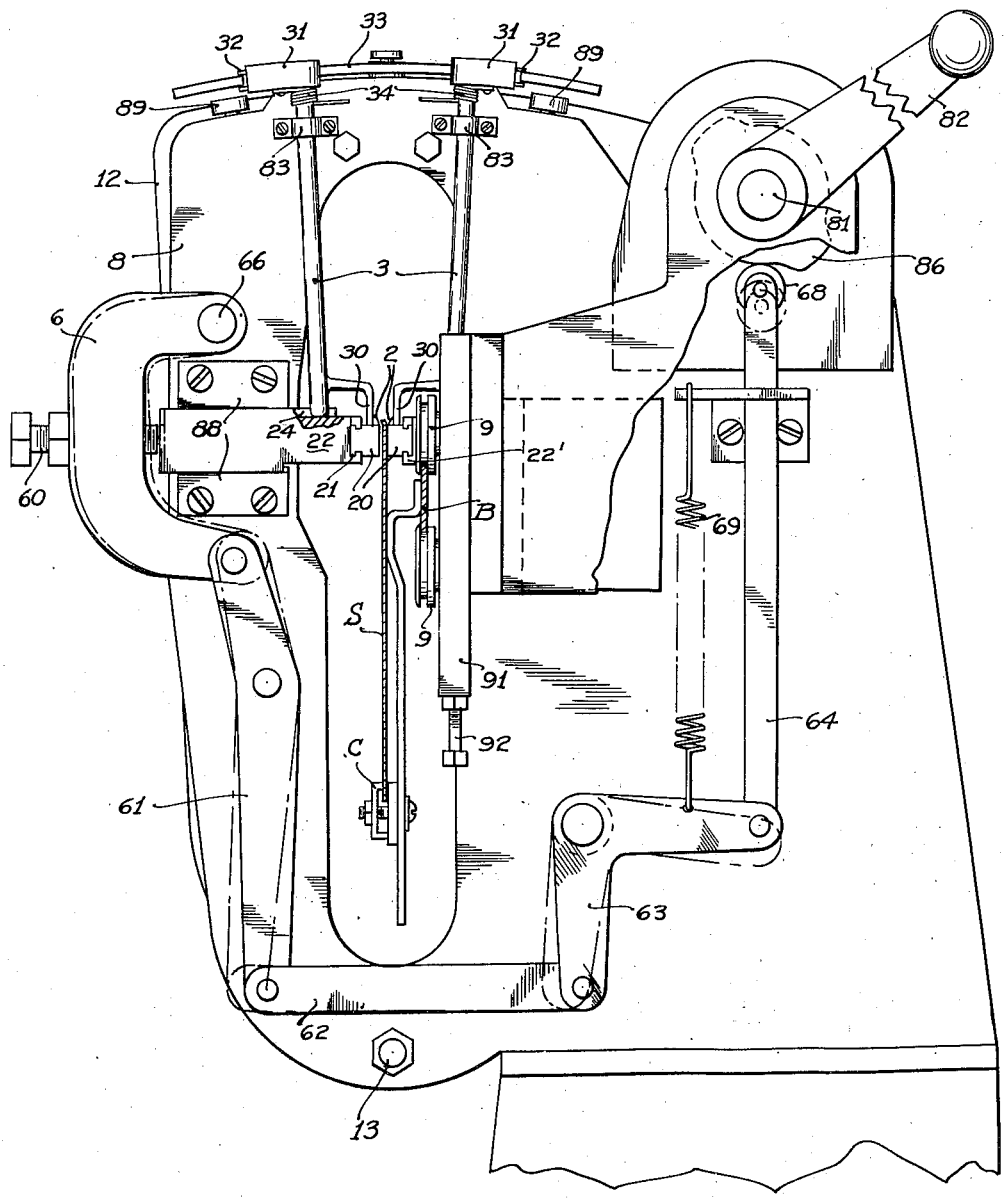
Figure 2 is a similar view looking at the opposite side of the machine.

Referring back to the clamping action between the slides 20, this is accomplished by any suitable means synchronized with the oscillation of the rocker plate 12, as for example by the clamping lever 6 pivoted at 66 upon the frame, and pressing through the adjustment screw 60, and by means of the linkage 61, 62, 63, 64 shown in Figure 2, or equivalent means, by reason of the force of the cam 86 upon the shaft 81, upon a cam follower 68 in opposition to the return spring 69. The cam 86 effects clamping of the saw between the slides 20 with each approach of a die 1 toward a tooth of the saw, and release of the saw following each setting operation.

In order to advance the saw intermediate successive tooth-setting operations, any suitable feed means are employed, and the feed means illustrated is not in itself considered novel, but merely as representative of any means that may be employed, suitable to the end in view. The feed must be adjustable at times for saws of different tooth spacings, the desideratum being to advance the saw by one tooth space intermediate each die contact or tooth setting. To these ends a dog 4 is pivotally mounted at 40 upon a lever 41 oscillatable at 42 upon the frame. The lever 41 is oscillated by the engagement of a cam follower 43 upon the lever with a cam 44 which is carried upon and oscillatable with the rocker plate 12. The dog 4 may be separate from its immediate support, so that it may be adjusted inwardly and outwardly with respect thereto. A spring 46 serves to retract the dog 4 following each feed advance, and also serves to hold a roller 45 upon the dog against the retracting cam 47, which may be considered as fixed in position, though it is adjustable by means such as are indicated at 48. Adjustment at the latter point regulates the length of the feed stroke while the dog engages the saw's teeth.

In order that the saw, with its guide bar B, shall not by its momentum move too far with each feed engagement of the dog 4 with the saw teeth, a brake 5, which need be only a fiber block supported upon the end of a lever 50 pivoted at 51 upon a frame bracket 85, is urged against the bar B by the spring 52.

The operation of inserting the saw in the machine has already been described in essence, the bar B which supports the saw being merely received and guided between the rolls 9. Thus supported, the saw is accurately located with relation to the setting point, or may be readily and accurately located by the adjustment at 92. Usually the saw has just been refiled, so that the newly formed teeth have substantially no set. It is now necessary to take care that the first operative die sets the first tooth to the correct side of the saw, and not oppositely, and that the feed of the saw by the dog 4 proceeds by increments of single tooth spacing, and not more.

Figure 1:
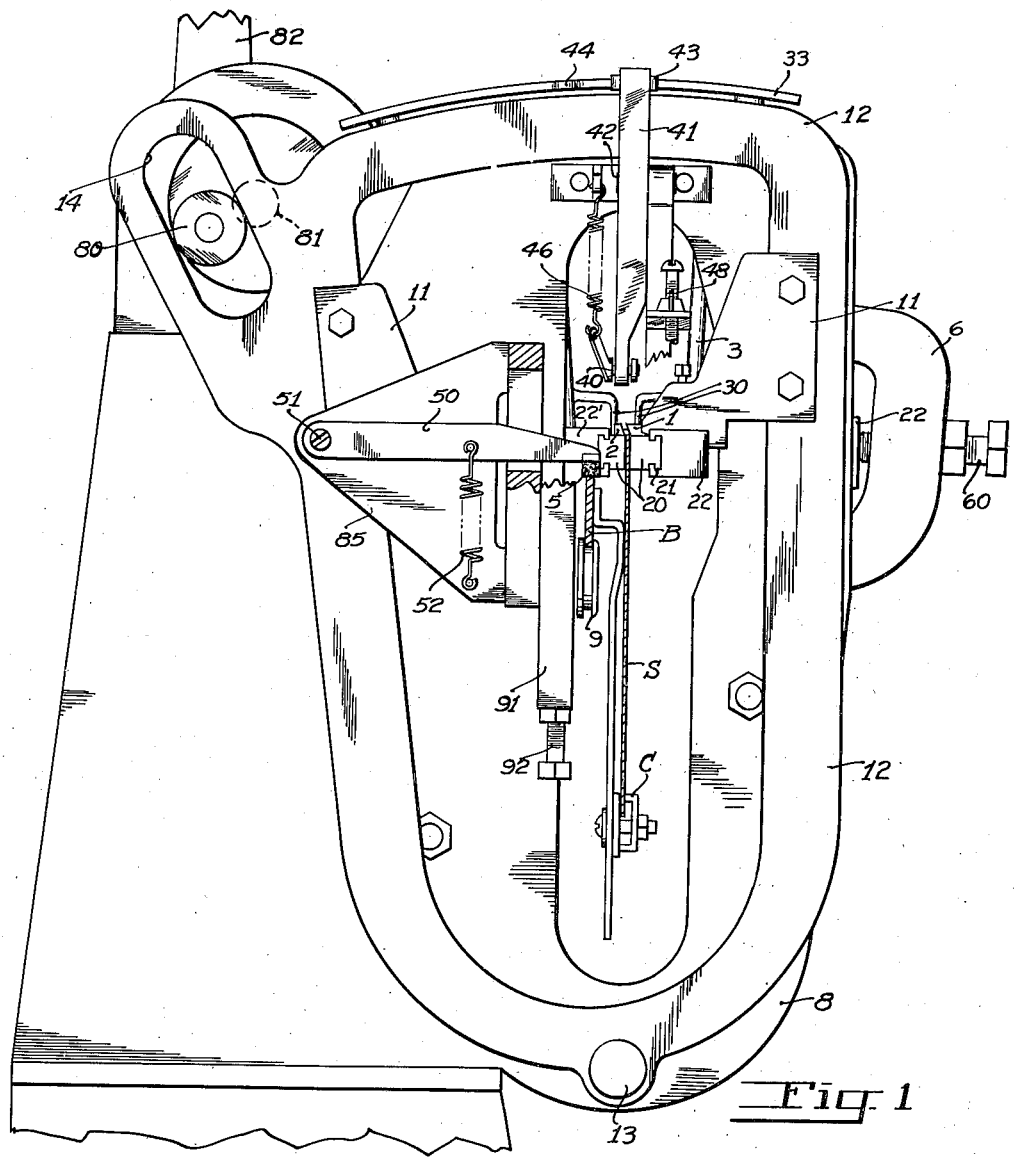
Figure 1 is a side elevation of the saw-setting machine, with parts broken away, the view being taken looking in the plane of the saw.

With these preliminary matters attended to, which usually require only checking, and little or no adjustment, the drive shaft 81 is rotated, either by the crank 82, or by motor means, if that is preferred. Each complete rotation of the shaft 81 effects a to and fro oscillation of the rocker plate 12. As the rocker plate moves to the right from the position shown in Figure 1, the left-hand die 1 will approach the setting point, and the anvil 2, corresponding to this particular left-hand die, and itself located on the right-hand side of the saw, comes into operative position in alignment with the oncoming die at the setting point. The anvil is brought into such position by oscillation of its shaft 3 as the rocker plate 12 carries the cam 33 past the cam follower 32. In similar fashion, and by substantially the same means, the anvil 2 on the left of the saw's plane has been shifted aside, out of the path of the oncoming left-hand die 1, as its own right-hand die moved to the right away from the setting point.

While this is taking place the cam 44 reaches and passes the follower 43, effecting reciprocation of the dog 4. Forward movement of the dog engages a tooth of the saw and advances the saw by one tooth space; the dog then withdraws, and the brake 5 retains the saw in the advanced position, with its next tooth presented at the setting point. This advance of the saw is completed before the oncoming left-hand die reaches the setting point, and the newly presented tooth now is interposed between this oncoming die 1 and its complemental anvil 2.

As the oncoming die 1 is about to exert a lateral force to deflect the newly presented tooth, the cam 86 acts upon the lever arm 6 to press that slide 20 which is at the left in Figure 2, against the saw, to clamp it between the two slides 20. Reliance to prevent endwise shifting of the saw under pressure, it may be seen, is not placed upon the brake 5, but that brake serves only to prevent overrun in feeding.

Figures 4, 5:
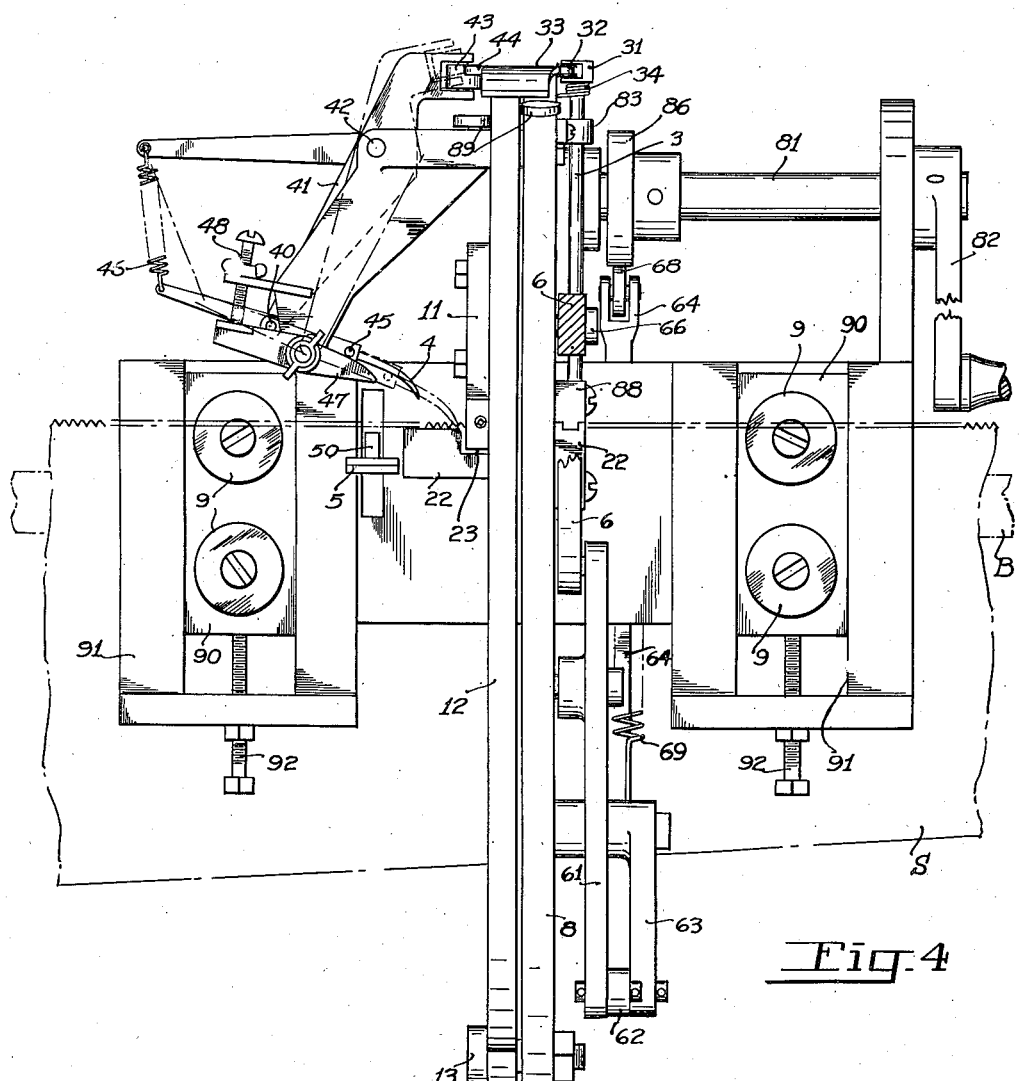
Figure 4 is a side elevation, the viewpoint being 90° removed from each of Figures 1 and 2, of the machine as a whole, certain parts being broken away.
Figure 5 is an isometric view, illustrating one of the anvils and its supporting and shifting means, and also a part of the saw clamping means.
Figure 6:
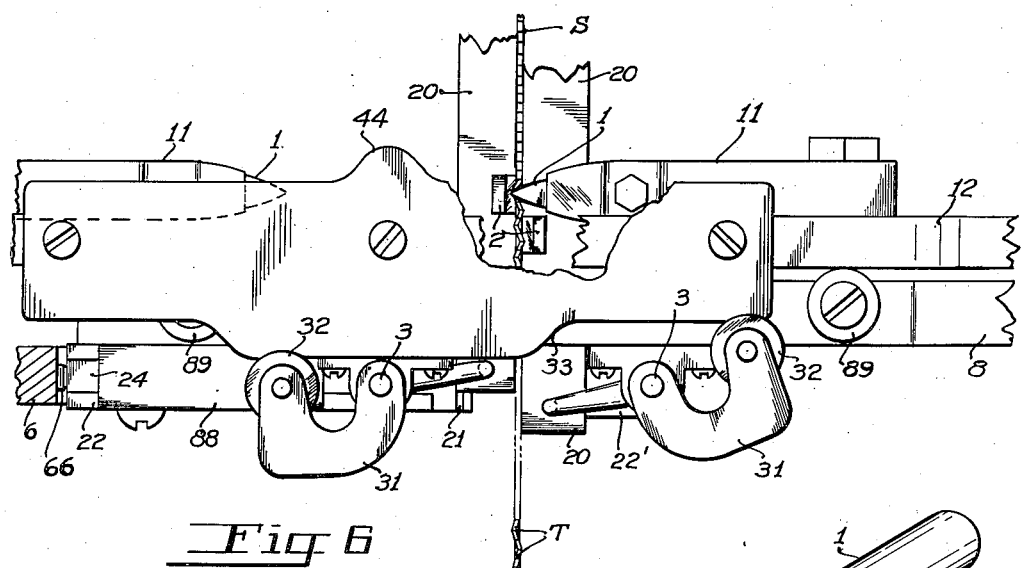
Figure 6 is a plan view showing one setting operation.

Now the die completes its pressure, and the tooth which it engages is accurately deflected or bent laterally, in the manner indicated in Figures 1, 3, 6, and 7. As rotation of the shaft 81 continues, the rocker plate 12 commences to move back to the left as viewed in Figure 1, the cam follower 68 has ridden down off the high point of the cam 86, the clamp between the slides 20 is released, as in Figure 2, and as the cams 33 cooperate with their cam followers 32, the shafts 3 are rocked again, shifting the previously active anvil 2 out of the way of the now oncoming right-hand die, as viewed in Figure 1, and shifting the previously inactive anvil 2 at the left of the saw in Figure 1 into operative position. At the same time the cam 44, by engagement with the cam follower 43, rocks the lever 41 and advances the dog 4, as indicated in Figure 4. The dog 4, dropping from its cam 47, engages a tooth of the saw, and advances the saw by the amount which corresponds to the spacing of a single tooth. The brake 5 prevents overrun, as has already been explained, and the next tooth is now presented to the right-hand die, as viewed in Figure 1, which sets this following tooth to the left of the saw's plane. Prior to the setting the clamp between the slide 20 is closed again, and now the cycle has been completed. Continued rotation of the shaft 81 advances the saw by single tooth increments between each setting, and succeeding teeth of the saw are set to the alternately opposite sides of the saw's plane, as is proper.

It will be understood, of course, that the feed arrangement might effect a feed by increments of more than a single tooth, as, for example, by increments of two teeth, and in such a case there might be a die on one side only, and the saw could then be set all to one side of its plane, and then, by reversing the saw, the set could be made by the same die and anvil to the opposite side of its plane. This, however, is not considered as advantageous as to set the successive teeth to the opposite sides of the saw, as has just been explained. The machine might be arranged to set two or more teeth at one operation, but the time saving would be but slight, and the chances for inaccuracy would be so greatly increased, that multiple setting is not preferred.

I claim as my invention:

1. A saw-setting machine comprising guide means supporting a saw for advance in the direction of its length, means for advancing the saw past a setting point by increments corresponding to single tooth spacings, two means arranged in a common plane which includes the setting point, at opposite sides of and movable transversely of the plane of the saw, formed and arranged to offset a tooth to successively opposite sides of the saw's plane, and two anvils each complemental to and at the opposite side of the saw from each such offsetting means and each cooperating with its complemental offsetting means to bend a tooth, and means to shift each anvil into the plane common to the two offsetting means and the setting point, in synchronism with the arrival of its complemental offsetting means at such setting point, and also to shift each such anvil from that plane before arrival of the other offsetting means at the setting point.

2. A saw-setting machine comprising guide means supporting a saw for advance in the direction of its length, means for advancing the saw past a setting point by increments corresponding to tooth spacings, two setting dies located at opposite sides of the saw and movable in a common plane transversely of the saw's plane to operatively engage alternate teeth from opposite sides, an anvil cooperating with each die, and located to engage the opposite side of the same tooth as its die, and means synchronized between each die and its anvil to shift the anvil into operative position as its die approaches operative position, and to shift said anvil from operative position as the other die approaches its operative position.

3. A saw-setting machine comprising guide means supporting a saw for advance in the direction of its length, means for advancing the saw past a setting point by increments corresponding to tooth spacings, two setting dies located at opposite sides of the saw and movable in a common plane transversely of the saw's plane to operatively engage alternate teeth from opposite sides, an anvil cooperating with each die, and guided for movement in the plane of the saw to and from operative position at the side of the saw opposite its cooperating die, and means to synchronize the movements of the dies and anvils, to shift each anvil into operative position as its die approaches its operative position, and conversely to shift the same anvil out of operative position as the other die approaches the position of said anvil, on the way to such other die's operative position.

4. The combination of claim 3, including cooperating guide means for each anvil disposed lengthwise of the saw.

5. A saw-setting machine as in claim 3, including means operatively associated with the respective anvils to clamp said saw, and means synchronized with the advancing and the setting means to release said clamping means during advance of the saw, and to clamp the saw during setting thereof.

6. A saw-setting machine comprising guide means supporting a saw for advance lengthwise in its own plane, means for advancing the saw past a setting point by increments corresponding to tooth spacings, a pair of setting dies movable in the same transverse plane into alternate operative engagement with the opposite sides of successive teeth of the saw, an anvil cooperating with each die and located at the opposite side of the saw from its die, a slide supporting each anvil, and guided for movement lengthwise the saw, and in position to engage the saw's opposite sides, to shift its anvil into operative position behind the tooth engaged by the corresponding die, and from such operative position for advance of the other die into operative engagement with the next tooth, timing means thus synchronizing the dies, their respective anvils, and the saw-advancing means, means to effect approach of said anvil-supporting slides to clamp the saw therebetween, and alternatively to release the saw, and means to synchronize such clamping with a tooth-setting operation and the release with a saw-advancing operation.

7. A saw-setting machine comprising a frame disposed generally in a plane transverse to the plane of the saw, and apertured for passage of the saw, guide means supported from said frame, guiding the saw for movement lengthwise in its own plane past a setting point, a rocker plate mounted upon said frame for pivoting about an axis lying generally in the plane of the saw, said rocker plate being apertured to surround the saw, two dies mounted upon opposite sides of said rocker plate, directed inwardly to engage opposite sides of the saw's teeth at the setting point, an anvil complemental to, and engaging the saw's teeth at the sides opposite, the respective dies, feed means supported from the frame, engageable with the saw's teeth to advance the saw by increments corresponding to tooth spacing, means to oscillate said rocker plate to move opposite dies alternately into operative engagement with successive teeth, means synchronized with the rocker plate to shift alternate anvils into operative position relative to the respective dies, at the setting point, and means synchronized with the oscillations of said rocker plate to effect operative engagement of said feed means with the saw teeth to advance unset teeth to the setting point after setting of precedingly set teeth.

8. A saw-setting machine comprising a frame disposed generally in a plane transverse to the saw's plane, and apertured for advance of the saw, guide means supported from said frame, guiding the saw for movement lengthwise in its own plane to carry its teeth past a setting point, a rocker plate pivotally mounted upon said frame beneath the saw, and apertured to surround the saw, two dies mounted at opposite sides of said rocker plate, directed inwardly in a common plane to engage opposite sides of the saw's teeth at the setting point, an anvil complemental to, and engaging the saw's teeth at the sides opposite, the respective dies, two slides guided for shifting lengthwise of and at opposite sides of the saw, and each supporting one of said anvils for movement into and from operative position at the setting point, two upright crank shafts journaled in the frame and each engaging its respective slide, feed means supported from the frame, engageable with the saw's teeth to advance the saw by increments corresponding to tooth spacing, means to oscillate said rocker plate, cam means interengageable between said rocker plate and said crank shafts to oscillate the latter, and their respective slides, oppositely, and further cam means to effect timed energization of the saw-advancing means intermediate engagement of each die with the saw's tooth.

9. A saw-setting machine comprising a frame disposed generally in a plane transverse to the saw's plane, and apertured for advance of the saw, guide means supported from said frame, guiding the saw for movement lengthwise in its own plane to carry its teeth past a setting point, a rocker plate pivotally mounted upon said frame beneath the saw, and apertured to surround the saw, two dies mounted at opposite sides of said rocker plate, directed inwardly in a common plane to engage opposite sides of the saw's teeth at the setting point, an anvil complemental to, and engaging the saw's teeth at the sides opposite, the respective dies, two slides guided for shifting lengthwise of and for engagement with opposite sides of the saw, and each supporting one of said anvils for movement into and from operative position at the setting point, a transverse guide supporting at least one of said slides, for approach of the two guides to clamp the saw therebetween and for separation to release the saw, an upright crank shaft engaged with each slide, and journaled in the frame, feed means supported from the frame, engageable with the saw's teeth to advance the saw past the setting point by increments corresponding to the tooth spacing, means to oscillate said rocker plate, and means synchronized with such oscillation to clamp said saw during engagement of a die with a tooth, and to release the saw thereafter; to oscillate the crank shafts to shift the anvils alternately one into and the other from operative position at the setting point, and to feed the saw during release of the clamping means.

10. A saw-setting machine comprising guide means supporting a saw for advance in the direction of its length past a single setting point, means disposed at opposite sides of the saw and movable transversely of the plane of the saw, each in alternation to engage that face which lies at the corresponding side of the saw, of successive teeth thus presented at the identical setting point, and formed and arranged to offset the tooth so engaged from the plane of the saw, two anvil means complemental to the respective offsetting means, but located respectively at opposite sides of the saw, and each movable into engagement with that face of the successive teeth which lies at the corresponding side of the saw, adjacent the base of the so-engaged tooth, while the corresponding offsetting means is engaging its other face, to back up the tooth against the force of the offsetting means, means to shift each anvil means independently of but in synchronism with movement of the two offsetting means, into such operative position, and therefrom, to back up the complemental offsetting means, and to clear the next-operative offsetting means, and means operative during disengagement of the saw by the anvil means and the offsetting means to advance the saw to position the next tooth to be set at the setting point.

11. A saw-setting means as in claim 10, including also brake means separate from the anvil means for retaining the saw, following its advance, located with an unset tooth at the setting point.

12. A saw-setting machine as in claim 10, the anvil means being guided for engaging and releasing movement also in a direction transverse to the saw's plane.

13. A saw-setting machine as in claim 10, the anvil means being guided for movement during engagement and release of the saw in a direction lengthwise of the saw.

14. A saw-setting machine as in claim 10, wherein the two offsetting means are alined one with the other, in a plane transverse of the plane of the saw, and means supporting and guiding the two anvil means for movement into backing up and clamping position at the setting point, and therefrom, in both longitudinal and transverse directions, relative to the saw, and for alternatively opposite movements, one relative to the other.

ROY F. PAULSON.

REFERENCES CITED

The following references are of record in the file of this patent:

UNITED STATES PATENTS

| Number | Name | Date |
| --- | --- | --- |
| 82,845 | Johnson | Oct. 6, 1868 |
| 418,874 | McIntire | Jan. 7, 1890 |
| 712,229 | Young | Oct. 28, 1902 |
| 1,457,588 | Majewski | June 5, 1923 |
| 1,535,962 | Summerell | Apr. 28, 1925 |
| 1,772,701 | Brown | Aug. 12, 1930 |
| 1,913,354 | Trimble | June 6, 1933 |
| 2,109,161 | Biro | Feb. 22, 1938 |
| 2,286,098 | Knutson | June 9, 1942 |
| 2,343,171 | Collier | Feb. 29, 1944 |
| 2,356,448 | Daggett | Aug. 22, 1944 |

FOREIGN PATENTS

| Number | Country | Date |
| --- | --- | --- |
| 27,622 | Great Britain | Nov. 28, 1910 |